June 24, 1924.
J. SUSIQ
COUPLER
Filed June 2, 1923 2 Sheets-Sheet 1
1,499,197
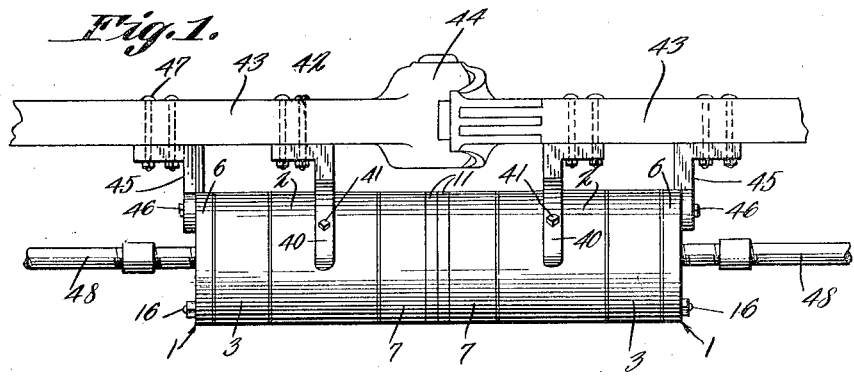
Fig. 1.
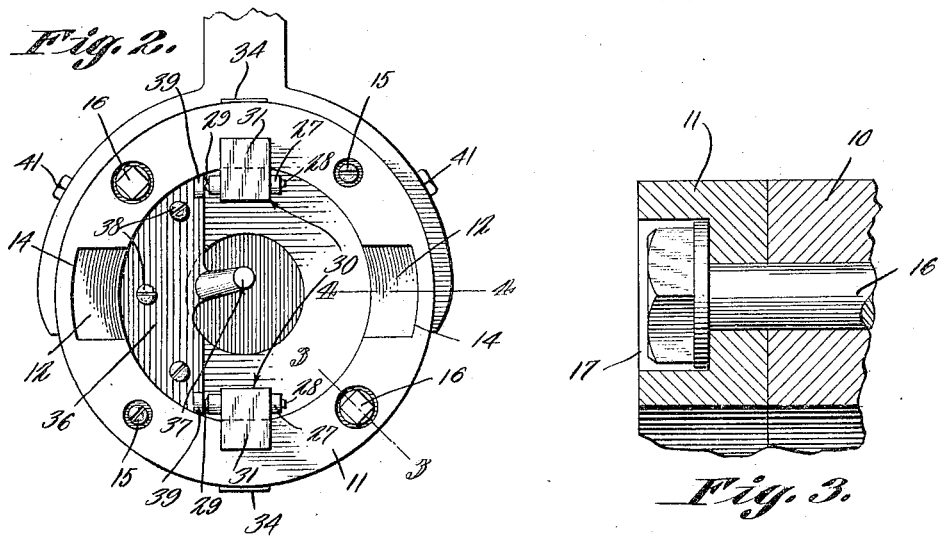
Fig. 2.
Fig. 3.
Fig. 4.
J. Susio,
Inventor.
By C.A. Snow & Co.
Attorneys

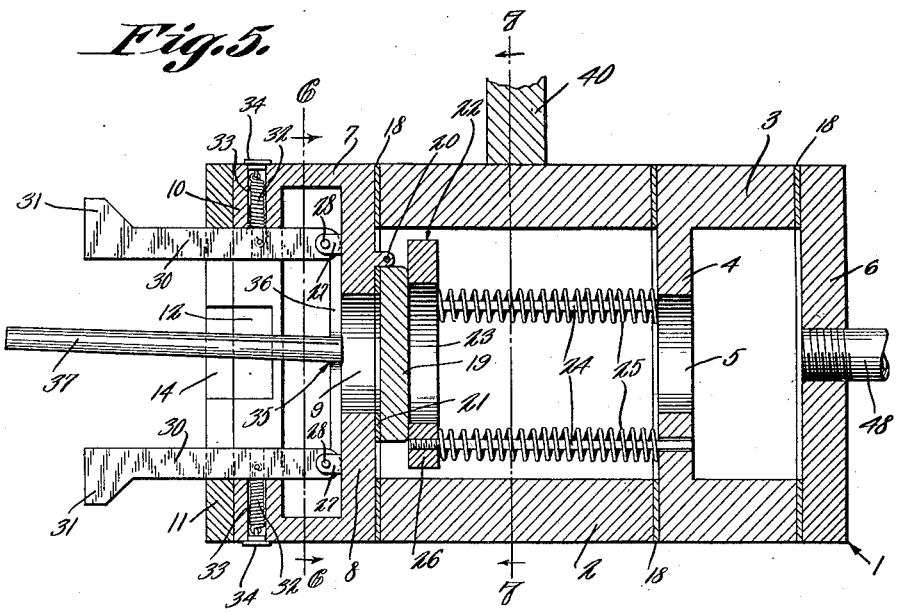

Patented June 24, 1924.

1,499,197

UNITED STATES PATENT OFFICE.

JOSEPH SUSIO, OF LEWIS RUN, PENNSYLVANIA.

COUPLER.

Application filed June 2, 1923. Serial No. 643,129.

*To all whom it may concern:*

Be it known that I, JOSEPH SUSIO, a citizen of the United States, residing at Lewis Run, in the county of McKean and State of Pennsylvania, have invented a new and useful Coupler, of which the following is a specification.

This invention aims to provide a simple means whereby the continuity of an air line or steam line may be established when two cars are brought together and coupled.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in elevation, a device constructed in accordance with the invention; Figure 2 is an end elevation, showing one of the casings and attendant parts; Figure 3 is a fragmental section taken on the line 3—3 of Figure 2; Figure 4 is a fragmental section taken on the line 4—4 of Figure 2; Figure 5 is a longitudinal section; Figure 6 is a cross section on the line 6—6 of Figure 5; Figure 7 is a cross section on the line 7—7 of Figure 5.

The device forming the subject matter of this application comprises a casing which is denoted generally by the numeral 1. The casing 1 may be made in various ways, but it may include a tubular body 2 and a rear end member 3 having a partition 4 provided with an opening 5, a closure 6 cooperating with the rear end member. The forward end member of the casing is marked by the numeral 7 and is supplied at its rear end with a partition 8 having a port 9, the forward end member being equipped with an inwardly extended annular flange 10, against which abuts an annular gasket 11. Guide grooves 12, having inclined walls, are fashioned in the inner edge of the annular flange 10 and there are notches 14 in the gasket 11, the notches being alined with the grooves. The gasket 11 is held with the inner edge of the flange 10 through the instrumentality of retractile springs 32, mounted in transverse bores 33 in the flange 10, the outer ends of the springs being carried by anchors 34 engaging the periphery of the forward end members 7.

The device embodies a valve opener 35 including a base plate 36 and a projecting arm 37. The base plate 36 is held by securing devices 38 on the partition 8, the base plate being supplied with lugs 39, which are so located as to engage the heads 29 of the pivot elements 28 thereby holding the pivot elements against accidental detachment from the ears 27.

A bracket 40 is secured at 41 to the body 2 of the casing 1 and is mounted at 42 on a draw bar 43 or other support, the coupler being indicated at 44. A securing bracket 45 may be connected at 46 to the closure 6 and may be connected at 47 to the draw bar or other support 43.

The air finds its way out of the casing 1 through a conduit 48 carried by the closure 6. The invention contemplates the use of two casings and attendant parts of the kind hereinbefore described, the casings and their parts being of identical construction, saving that the latches 30 on one casing are disposed in a plane at right angles to the latches on the other casing, so that when two cars come together, the ends of the latches on the respective casings will engage with the guide grooves 12, the latches first swinging inwardly, the springs 32 being elongated, and the springs then contracting, to cause the projections 31 of the latches to engage behind the flanges 10, thereby holding the gaskets 11 on the flange 10 by securing elements 15, engaging the flange 10, and by securing devices 16, such as bolts, which pass through the gasket 11, the forward end member 7, the body 2, the rear end member 3 and the closure 6, to hold the aforesaid parts together, the forward ends of the bolts 16 being countersunk, as at 17, into the gasket 11. Washers 18 may be interposed between the parts 7—2, 2—3 and 3—6.

A valve 19 is hinged at 20 to the partition 8 and controls the port 9, the valve being supplied with a compressible gasket 21 adapted to bear against the partition 8 and to secure an hermetic closure. The device includes a follower 22 including an annular head 26 having an opening 23, the head of the follower being mounted on stems 24 mounted for reciprocation in the partition 4, compression springs 25 surrounding the stems 24, the rear ends of the stems abutting against the partition 4, and the forward ends of the stems abutting against the head 26 of the follower 22 to hold the head of the follower against the valve 19, thereby retaining the valve yieldably in closed position with respect to the port 9. Since the head 26 of the follower is of annular form, and has the opening 23, the flow of air through the device is facilitated when the valve 19 opens and when the follower 22 moves to the right in Figure 5. The partition 8 is provided with forwardly extended ears 27 through which pass pivot elements 28 having heads 29. The inner ends of latches 30 are mounted to swing on the pivot elements 28, the latches extending outwardly beyond the gasket 11 and being provided with laterally extended projections 31. The intermediate portions of the latches 30 are held in abutment in contact as shown in Figure 1, to afford an hermetic joint.

When the couplers are brought together as aforesaid, the arm 31 on each coupler causes the valve 19 on the other coupler to swing to an open position, the followers 22 retiring, the springs 25 being compressed, the continuity of the air line thus being obtained. When the cars are separated, the valve 19 moves to closed position, under the action of the resiliently advanced follower 22, the parts being restored to the position shown in Figure 5.

What is claimed is:

1. In a device of the class described, a casing provided intermediate its ends with an internal partition having a port, a swinging valve carried by the partition and controlling the port, a follower mounted for right line sliding movement in the casing and cooperating with the valve, spring means for advancing the follower to hold the valve closed with respect to the port, latches mounted pivotally on the partition and extended outwardly of the casing, and an opener carried by the partition and so located as to open the valve of a like casing when two casings of the construction specified are brought together.

2. In a device of the class described, a casing having a port, a valve controlling the port, a pivot element on the casing, a latch mounted to swing on the pivot element, and an opener mounted on the casing and adapted to cooperate with the valve of a like casing, the opener comprising a part engaging the pivot element to hold the pivot element on the casing against detachment therefrom.

3. A device of the class described comprising an intermediate partition having a port, a hinged valve controlling the port, and mounted on the partition, a follower comprising a head engaging the valve to hold the valve closed, the head being provided with an opening for the passage of air, means for mounting the follower in the casing for right line sliding movement, spring means for advancing the follower, and a latch carried by the partition and extended forwardly with respect to the casing.

4. A device of the class described comprising a casing provided intermediate its ends with a partition having a port, a valve controlling the port, an opener projecting from the partition and adapted to cooperate with the valve of a like casing, spring means for closing the valve, and a latch mounted to swing on the partition.

In testimony that I claim the foregoing as my own, I have hereunto affixed my signature in the presence of two witnesses.

JOE SUSIO.

Witnesses:
 CESIDIO SUSIO,
 RAYMOND F. HAVEN.

Certificate of Correction.

It is hereby certified that in Letters Patent No. 1,499,197, granted June 24, 1924, upon the application of Joseph Susio, of Lewis Run, Pennsylvania, for an improvement in "Couplers," an error appears in the printed specification requiring correction as follows: Page 1, line 56, beginning with the words "with the inner edge of" strike out all to and through the words "holding the gaskets 11" in lines 94 and 95, and insert the same to follow after the word "abutment" in line 23, page 2; and that the said Letters Patent should be read with this correction therein that the same may conform to the record of the case in the Patent Office.

Signed and sealed this 17th day of November, A. D. 1925.

[SEAL.]

WM. A. KINNAN,
*Acting Commissioner of Patents.*